(12) United States Patent
Ejiri

(10) Patent No.: US 8,800,958 B2
(45) Date of Patent: Aug. 12, 2014

(54) SLOW-ACTING ON/OFF VALVE

(75) Inventor: Takashi Ejiri, Tokyo (JP)

(73) Assignee: Fujikura Rubber Ltd., Tokyo (JP)

(*) Notice: Subject to any disclaimer, the term of this patent is extended or adjusted under 35 U.S.C. 154(b) by 50 days.

(21) Appl. No.: 13/496,668

(22) PCT Filed: Jul. 9, 2010

(86) PCT No.: PCT/JP2010/061676
§ 371 (c)(1),
(2), (4) Date: Mar. 16, 2012

(87) PCT Pub. No.: WO2011/036932
PCT Pub. Date: Mar. 31, 2011

(65) Prior Publication Data
US 2012/0168653 A1 Jul. 5, 2012

(30) Foreign Application Priority Data

Sep. 24, 2009 (JP) ................................ 2009-218366

(51) Int. Cl.
*F16K 31/00* (2006.01)
*F16K 1/30* (2006.01)
(52) U.S. Cl.
CPC ................ *F16K 1/307* (2013.01); *F16K 1/305* (2013.01)
USPC ............................ 251/63.5; 251/63.4; 91/447
(58) Field of Classification Search
USPC ............. 251/58, 62, 63.4, 63.5; 91/433, 445, 91/447, 443; 60/494
See application file for complete search history.

(56) References Cited

U.S. PATENT DOCUMENTS 2,080,810 A * 5/1937 Douglas ........................ 417/219
2,499,262 A * 2/1950 Stoudt .......................... 200/82 R (Continued)

FOREIGN PATENT DOCUMENTS

JP 39-22795 10/1964
JP 54-153419 U 10/1979

(Continued)

OTHER PUBLICATIONS

International search report for PCT/JP2010/061676 dated Sep. 15, 2010.

*Primary Examiner* — John K Fristoe, Jr.
*Assistant Examiner* — Umashankar Venkatesan
(74) *Attorney, Agent, or Firm* — McCormick, Paulding & Huber LLP

(57) ABSTRACT

Disclosed is a slow-acting ON/OFF valve which includes a valve-opening pressure chamber that makes an actuating member (which actuates a valve body that comes into contact with and moves away from a valve seat to close and open a flow passage) move in a valve-opening direction against a spring biasing force in a valve-closing direction, and supplies air to the valve-opening pressure chamber, in minute increments, via a flow rate regulation valve. In this slow-acting ON/OFF valve, the dead time from the receipt of a valve-opening signal to the commencement of a valve-opening operation is short. A manifold is provided independently of the valve-opening pressure chamber. Between the valve-opening pressure chamber and the manifold, the following three valves are provided: a pressure regulation valve which allows air to flow into the valve-opening pressure chamber from the manifold until pressure in the valve-opening pressure chamber reaches a predetermined reserve pressure and which is closed upon the pressure in the valve-opening pressure chamber reaching the reserve pressure; a flow rate regulation valve which supplies air to the valve-opening pressure chamber from the manifold, in minute increments, after the pressure in the valve-opening pressure chamber reaches the reserve pressure; and an exhaust valve which rapidly discharges air in the valve-opening pressure chamber to the manifold upon pressure in the manifold dropping below the pressure in the valve-opening pressure chamber and is thereafter closed.

2 Claims, 6 Drawing Sheets

(56) References Cited

U.S. PATENT DOCUMENTS

| | | | | |
|---|---|---|---|---|
| 2,603,235 A | * | 7/1952 | Kirkham | 137/493.8 |
| 2,701,116 A | * | 2/1955 | Roth | 251/66 |
| 3,119,308 A | * | 1/1964 | Dantowitz | 91/38 |
| 4,197,874 A | * | 4/1980 | Neff | 137/270 |
| 4,343,228 A | * | 8/1982 | Wallis | 91/457 |
| 5,007,328 A | * | 4/1991 | Otteman | 92/63 |
| 5,950,924 A | * | 9/1999 | Hatakeyama et al. | 239/119 |
| 6,244,562 B1 | * | 6/2001 | Ejiri | 251/63.6 |
| 6,244,563 B1 | * | 6/2001 | Ejiri | 251/63.6 |
| 7,823,859 B2 | * | 11/2010 | Ejiri | 251/60 |

FOREIGN PATENT DOCUMENTS

| | | |
|---|---|---|
| JP | 3-60666 U | 6/1991 |
| JP | 3309052 B2 | 3/1998 |

* cited by examiner

SLOW-ACTING ON/OFF VALVE

CROSS REFERENCE TO RELATED APPLICATIONS

This application claims the priority of Japanese patent application No. 2009-218366, filed on Sep. 24, 2009 and PCT Application No. PCT/JP2010/061676, filed on Jul. 9, 2010, the disclosures of which are incorporated herein by reference in their entirety.

TECHNICAL FIELD

The present invention relates to a slow-acting ON/OFF valve (normally-closed valve) which is superior in responsiveness, from when a valve-opening signal (air pressure) is given until a value-opening operation is carried out, even though the valve-opening operation itself is slow.

BACKGROUND ART

Conventionally, pneumatic-operated ON/OFF valves used for high-pressure gas cylinders have been satisfactorily achieved in terms of automatization of the valve-opening/closing operation but have not satisfactorily complied with the demand for a slowing-down of the valve opening speed. For instance, when certain types of gases are mixed in a reaction chamber, it is sometimes required that the gasses to be mixed are supplied into the reaction chamber as slow as possible. Applicants including the applicant of the present invention and inventors including the inventor of the present invention have proposed a slow-acting ON/OFF valve capable of satisfying such a demand and have obtained patents for such a valve. See Japanese Patent Publication No. 2,784,446 and Japanese Patent Publication No. 3,359,953. In addition, a different solution for the same problem has been proposed by not only these applicants including the applicant of the present invention but also by other applicants. See Japanese Patent Application Publication No. H11-30399.

SUMMARY OF INVENTION

Technical Problem

However, the devices in Japanese Patent Publication No. 2,784,446 and Japanese Patent Publication No. 3,359,953 have been made based on the idea of providing a valve mechanism which communicatively connects a valve-opening pressure chamber to a pilot pressure source when a piston body (actuating member) for opening and closing a fluid channel is in the valve closed position and which cuts off the communicative connection immediately after the piston body commences moving. Such a valve mechanism is complicated in structure; moreover, adjustments to the operatively-associated movement between the piston body and the valve mechanism are complicated. Furthermore, the valve mechanism disclosed in Japanese Patent Application Publication No. H11-30399 is likewise complicated.

The present invention has been devised in view of the awareness of the above described issues, and an objective of the present invention is to achieve a slow-acting ON/OFF valve which is simple in structure and superior in responsiveness, from when a valve-opening signal (air pressure) is given until a valve-opening operation is carried out.

SUMMARY OF THE INVENTION

The present invention has been accomplished by finding that the objective can be achieved by an extremely simple structure in which a manifold is formed separately from a valve-opening pressure chamber which makes the actuating member move in the valve-opening direction and in which three valves: a pressure regulation valve, a flow regulation valve and an exhaust valve, are installed between the valve-opening pressure chamber and the manifold.

Specifically, the present invention is characterized by a slow-acting ON/OFF valve including an actuating member which actuates a valve body that comes into contact with and moves away from a valve seat to close and open a flow passage; a spring device which biases the actuating member in a valve-closing direction; a valve-opening pressure chamber which exerts a force in a valve-opening direction on the actuating member against the spring device; a manifold provided independently of the valve-opening pressure chamber; a pressure regulation valve which allows air to flow into the valve-opening pressure chamber from the manifold until pressure in the valve-opening pressure chamber reaches a predetermined reserve pressure, and which is closed upon the pressure in the valve-opening pressure chamber reaching the reserve pressure; a flow rate regulation valve which supplies air to the valve-opening pressure chamber from the manifold, in minute increments, after the pressure in the valve-opening pressure chamber reaches the reserve pressure; and an exhaust valve which discharges air in the valve-opening pressure chamber to the manifold upon pressure in the manifold dropping below the pressure in the valve-opening pressure chamber.

It is desirable that the exhaust valve be provided with a rapid actuation button for communicatively connecting the manifold to the valve-opening pressure chamber when the valve needs to be opened rapidly.

Advantageous Effects of Invention

According to the present invention, by an extremely simple structure in which a manifold is formed separately from a valve-opening pressure chamber that makes the actuating member move in the valve-opening direction and in which three valves: a pressure regulation valve, a flow regulation valve and an exhaust valve, are installed between the valve-opening pressure chamber and the manifold, a slow-acting ON/OFF valve can be achieved which is superior in responsiveness, from when a valve-opening signal (air pressure) is given until a valve-opening operation is carried out, and which makes the valve-opening operation performed slowly.

DESCRIPTION OF THE PREFERRED EMBODIMENTS

Figure 1:
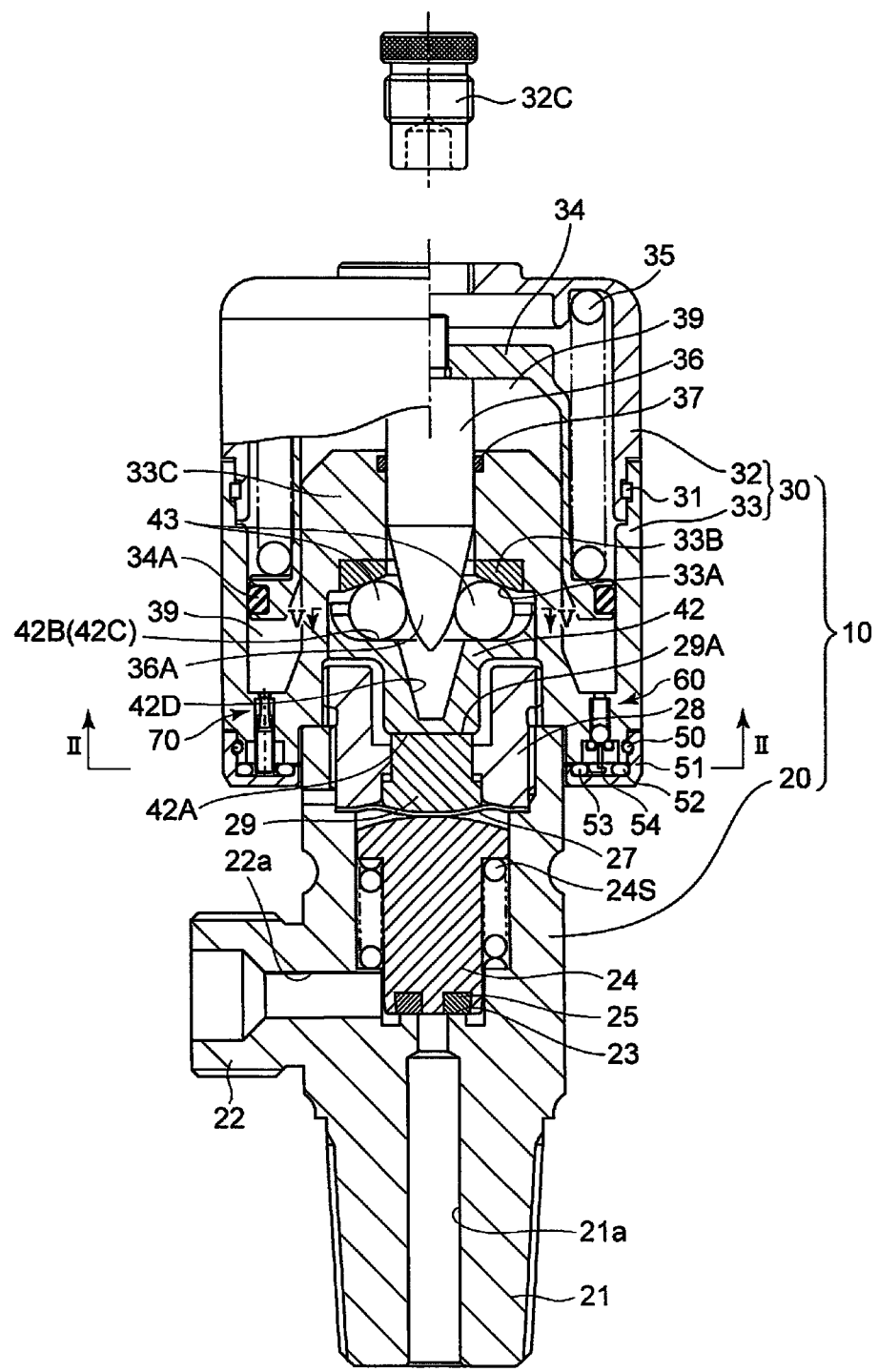
FIG. 1 is a sectional view taken along the line I-I shown in FIG. 2, showing an embodiment of a slow-acting ON/OFF valve according to the present invention.

As shown in FIG. 1, the present embodiment of a slow-operating ON/OFF valve 10 is provided with a gas cylinder head 20, which is detachably attached to a high-pressure tank (gas cylinder), and a bonnet (housing/cylinder) 30.

The gas cylinder head 20 is provided with a screw-in connecting projection 21, which screws into the high-pressure tank, and a threaded-tap projection 22. A flow passage 21a and a flow passage 22a which are communicatively connected to each other in a mutually orthogonal positional relationship are formed in the screw-in connecting projection 21 and the threaded-tap projection 22, respectively. An annular valve seat 23 is formed in the gas cylinder head 20 to be positioned concentrically with the flow passage 21a in a passageway portion between the flow passage 21a and the flow passage 22a, and an ON/OFF valve body 24 which comes into contact with and moves away from the annular valve seat 23 to close and open the flow passage is supported to be slidable on the same axis as the flow passage 21a. An annular valve seal 25 that is made of a softer material than the annular valve seat 23 and has a high sealing capability is fixedly embedded into the ON/OFF valve body 24. The valve seal 25 can be made of, e.g., PCTFE.

A retainer 28 is fixedly screw-engaged into the gas cylinder head 20 to be coaxial with the flow passage 21a and the ON/OFF valve body 24 with a metal diaphragm 27 held between the retainer 28 and the gas cylinder head 20, and an intermediate valve body 29 which approaches and retreats from the ON/OFF valve body 24 is fitted into the retainer 28 to be slidable thereon in a state of being prevented from coming out of the retainer 28 with the metal diaphragm 27 held between the intermediate valve body 29 and the ON/OFF valve body 24. The ON/OFF valve body 24 is biased to move in a direction to open the valve body 24 (and the intermediate valve body 29) by a valve-opening biasing spring (compression spring) 24S. The upper end of the intermediate valve body 29 with respect to FIG. 1 (the end thereof on the opposite side from the metal diaphragm 27) constitutes an external-force input end 29A.

The bonnet (housing) 30 is composed of an upper bonnet (upper housing) 32 and a lower bonnet (lower housing) 33 which are connected to each other via a lock ring 31. The lower bonnet 33 is fixedly screw-engaged with the retainer 28. The lower bonnet 33 (the bonnet 30) is detachably attached to the retainer 28 (the gas cylinder head 20).

A piston body (actuating member) 34 is fitted into the bonnet 30 (the lower bonnet 33) via an O-ring 34A to be slidable in an air-tight fashion. The piston body 34 is biased to move toward the intermediate valve body 29 by a valve-closing biasing spring (compression spring) 35 which is inserted in between the piston body 34 and the upper bonnet 32. The force of the valve-closing biasing spring 35 is greater than that of the valve-opening biasing spring 24S. The reference numeral 32c shown in FIG. 1 denotes a lock screw which prevents the valve from opening that may be caused by vibrations created when, e.g., the valve is moved.

A transmission stem 36 is fixed to the piston body 34 on the axis thereof, and the transmission stem 36 is slidably supported by a central cylindrical portion 33C of the lower bonnet 33 in an air-tight fashion via an O-ring 37. A valve-opening pressure chamber 39 is defined between the piston body 34 and the lower bonnet 33. A clearance exists between the piston body 34 and the central cylindrical portion 33C of the lower bonnet 33 (although the valve-opening pressure chamber 39 is illustrated to be divided into upper and lower parts in FIG. 1, their parts are communicatively connected to each other).

Figure 3:
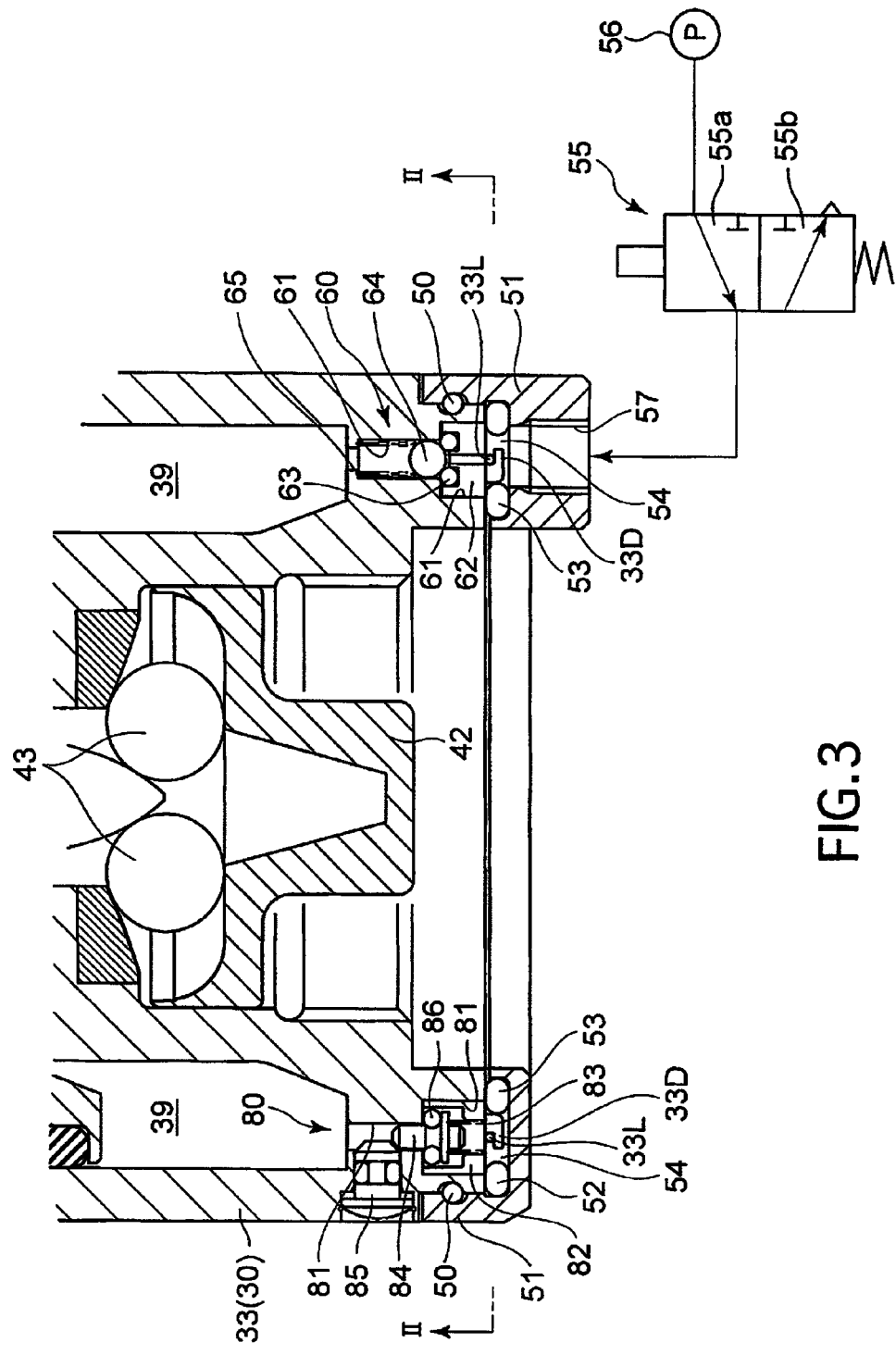
FIG. 3 is a sectional view taken along the line shown in FIG. 2.

A push rod (pressing member) 42 is slidably fitted within the bonnet 30 (the lower bonnet 33) in the lower end thereof with respect to FIGS. 1 and 3 (the end thereof on the intermediate valve body 29 side). The lower end of the push rod 42 constitutes an output end 42A that abuts against the external-force input end 29A of the intermediate valve body 29.

A diameter reducing portion 36A, the diameter of which reduces toward the push rod 42, is formed at the lower end (the end toward the push rod 42) of the transmission stem 36, and a motion transmission surface 42B and a motion transmission surface 33A which are spaced from each other are formed on the push rod 42 and the lower bonnet 33, respectively, so as to be positioned around the diameter reducing portion 36A. The motion transmission surface 33A on the lower bonnet 33 is fixed, while the motion transmission surface 42B on the push rod 42 is movable.

Figure 5:
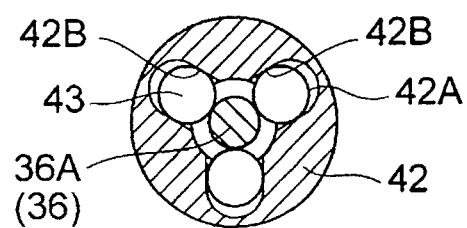
FIG. 5 is a sectional view taken along the line V-V shown in FIG. 1.
Figure 6:
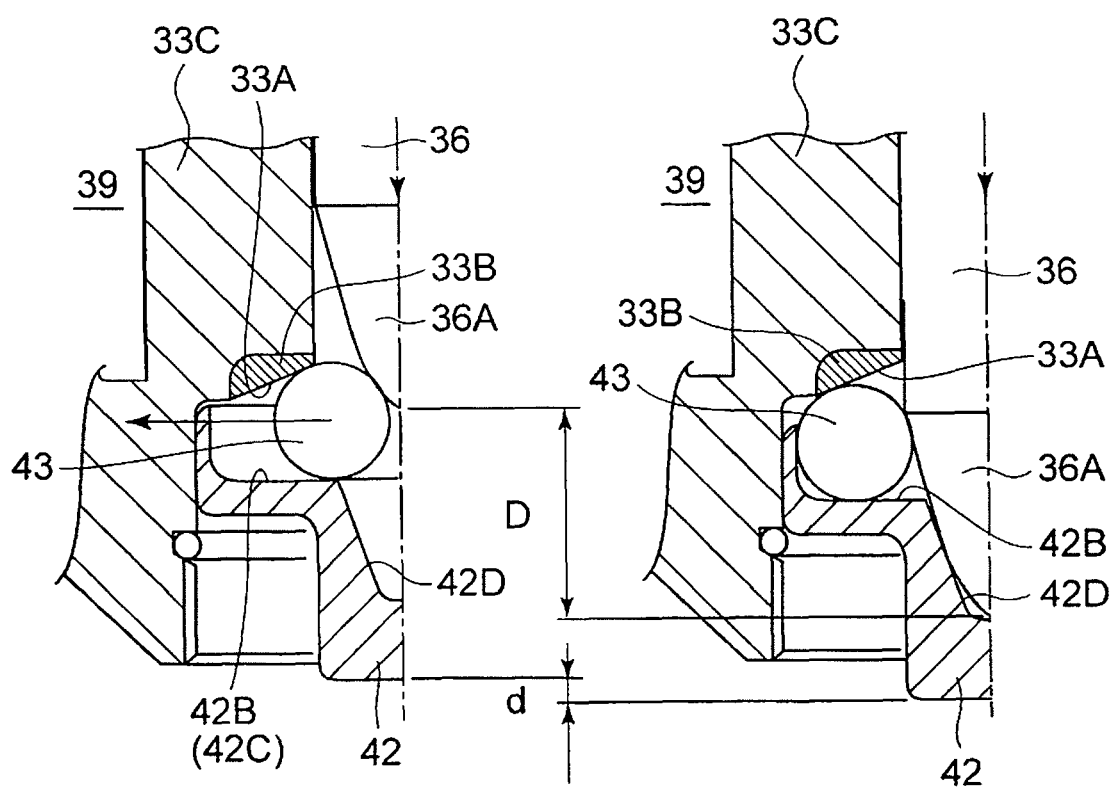
FIG. 6 is an enlarged sectional view showing details of a portion of the slow-operating ON/OFF valve shown in FIGS. 1 and 3 which includes a motion transmission surface of a bonnet, a motion transmission surface of a push rod, a diameter-reducing portion of a transmission stem and radially movable members (steel balls)

The diameter reducing portion 36A of the transmission stem 36 is formed as part of a spherical surface (or an aspherical surface) in the present embodiment. The movable motion transmission surface 42B is a surface that is orthogonal to the axis of the push rod 42 (the transmission stem 36), and the fixed motion transmission surface 33A is formed as part of a conical surface about the axis of the push rod 42 which narrows the distance between the motion transmission surface 33A and the motion transmission surface 42B in directions toward the circumference of the motion transmission surface 33A. As shown in FIGS. 5 and 6, the motion transmission surface 42B is formed as a bottom surface of three radial grooves 42C which are formed in the push rod 42 at equi-angular intervals, and each radial groove 42C has a steel ball (radially-movable body) 43 rotatably fitted therein. The radial grooves 42C can take an arbitrary shape such as a V-section groove, a circular-arc-section groove, etc. The steel balls 43 simultaneously contact each of the diameter reducing portion 36A of the transmission stem 36 and the pair of motion-transmission surfaces 33A and 42B. In addition, the motion transmission surface 33A is formed on a highly abrasion resistant hard ring body (back plate) 33B which is formed as a separate member from the lower bonnet 33; the hard ring body 33B is fixed to the lower bonnet 33. The transmission stem 36, the push rod 42 and the hard ring body 33B are made of, e.g., quenchable SUJ2, SUS440C, etc. A clearance recess 42D into which the diameter reducing portion 36A of the transmission stem 36 advances and retreats from is formed in the shaft portion of the push rod 42.

The above described structure around the transmission stem 36 and the push rod 42 is a booster mechanism which boosts the valve-closing power, created by the valve-closing biasing spring 35, before transmission of this power to the push rod 42 (to the ON/OFF valve body 24 from the intermediate valve body 29), and this booster mechanism is known per se in the art. As shown in FIG. 6, this booster mechanism can move the push rod 42 by a movement amount d which is smaller than a movement amount D of the transmission stem 36 (D>d) due to the operation of the diameter reducing portion 36A, the motion transmission surface 33A and the motion transmission surface 42B, and therefore can press the valve seal 25 of the ON/OFF valve body 24 against the annular valve seat 23 to close the valve via the intermediate valve body 29 with a strong force. The power-assistance ratio D/d can be freely set in accordance with the angle between the motion transmission surface 33A and the motion transmission surface 42B, and the angle of the diameter reducing portion 36A. In the illustrated embodiment, approximately 10 times the force of the valve-closing biasing spring 35 is generated at the push rod 42 via the piston body 34, the transmission stem 36, the steel balls 43 and the hard ring body 33B, and the amount of movement is approximately 1/10.

An underside cover 51 is rotatably supported by the lower bonnet 33 of the bonnet 30 at the lower end thereof via a lock ring 50 as shown in FIGS. 1 and 3. The underside cover 51 compresses and supports a large O-ring 52 and a small O-ring 53 on a lower end surface of the lower bonnet 33 to form an annular manifold (pressure chamber) 54 between the O-rings 52 and 53. As shown in FIG. 3, a pressure inlet port 57 (only shown in FIG. 3) which introduces a pilot pressure from a pilot pressure source 56 into the manifold 54 via a switching valve 55 is formed in the underside cover 51. Since the underside cover 51 is rotatably supported by the lower bonnet 33, the position of the pressure inlet port 57 can be arbitrarily selected (set).

Figure 2:
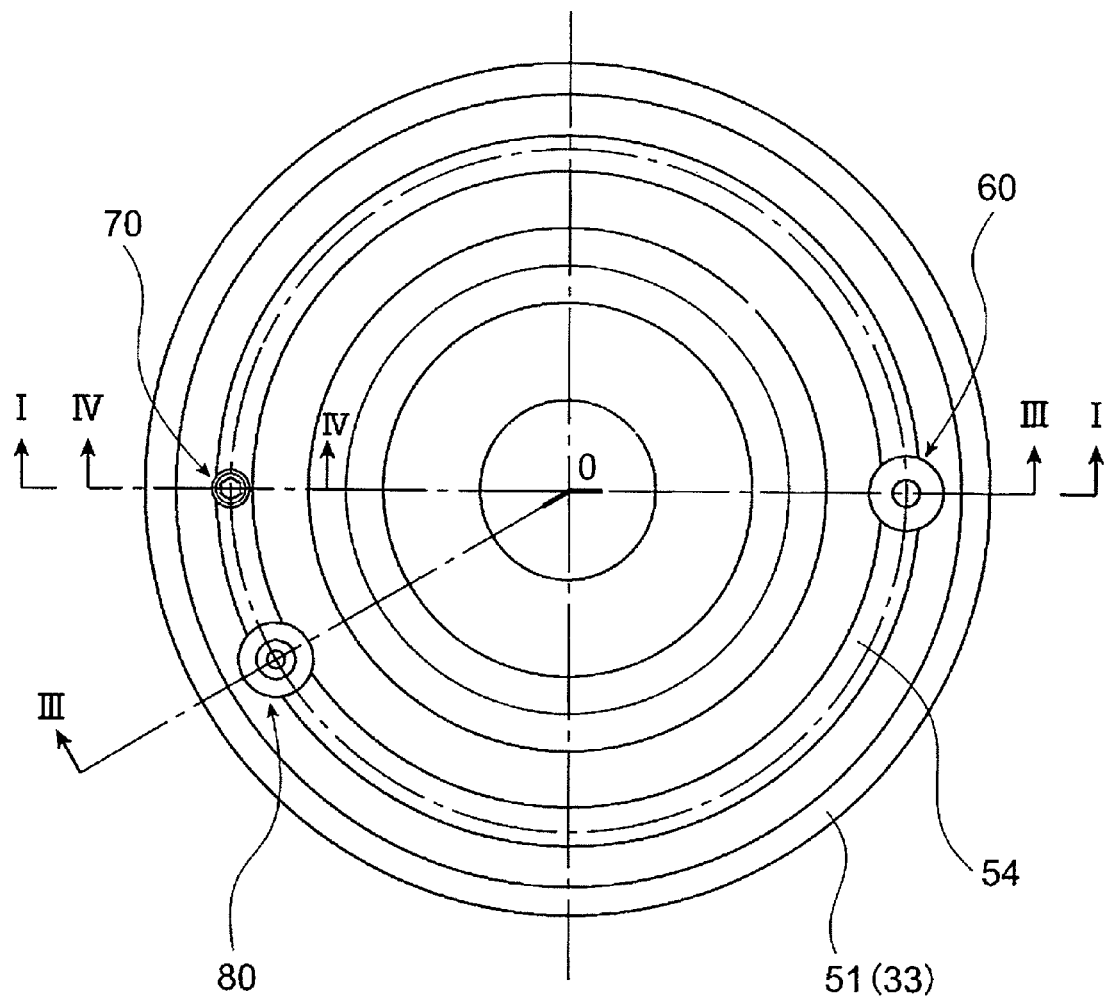
FIG. 2 is an enlarged sectional view taken along the line II-II shown in FIG. 1.

The lower bonnet 33 is provided with three valves: a pressure regulation valve 60 which regulates the state of communicative connection between the manifold 54 and the valve-opening pressure chamber 39, a needle valve (flow rate regulation valve) 70, and an exhaust valve 80. FIG. 2 shows an example of the planar positional relationship among these three valves.

As shown in FIG. 3, the pressure regulation valve 60 has a configuration such that a retainer 62, an O-ring (valve seat) 63, a steel ball (valve body) 64 and a compression coil spring 65 which presses the steel ball 64 against the O-ring 63 are arranged in that order in a communication passage 61 which communicatively connects the valve-opening pressure chamber 39 and the manifold 54 to each other, and the pressure regulation valve 60 is a pressure regulation valve (relief valve) which allows air to flow into the valve-opening pressure chamber 39 from the manifold 54 until the pressure in the valve-opening pressure chamber 39 reaches a predetermined reserve pressure, and is closed upon the pressure in the valve-opening pressure chamber 39 reaching the reserve pressure. The valve-opening pressure of the pressure regulation valve 60 can be set with extremely high precision by setting the spring force.

Figure 4:
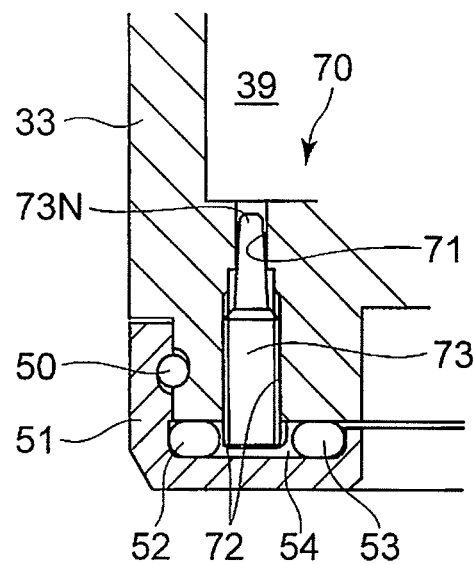
FIG. 4 is a sectional view taken along the line IV-IV shown in FIG. 2.

As shown in FIG. 4, the needle valve 70 has a configuration such that a needle valve body 73 is screwed, via a screw thread 72, into a communication passage 71 which communicatively connects the valve-opening pressure chamber 39 and the manifold 54 to each other, and plays a role of supplying compressed air in the manifold 54 into the valve-opening pressure chamber 39, in minute increments, after the pressure regulation valve 60 is closed upon a balance between the pressure in the valve-opening pressure chamber 39 and the reserve pressure being achieved. Air in the manifold 54 flows through the gap between threads of the screw thread 72 and the minute gap between a needle portion 73N at the tip of the needle valve body 73 and the communication passage 71, so that the flow rate per unit of time can be controlled to an extremely small amount by adjusting the screw-thread engagement position (the amount of screw-thread engagement) of the needle valve body 73.

As shown in FIG. 3, the exhaust valve 80 has a configuration such that a retainer 82, a compression spring 83 and an exhaust valve body 84 which is biased by the compression spring 83 in a direction to close the flow passage are installed, in that order from the manifold 54 side, in a communication passage 81 which communicatively connects the valve-opening pressure chamber 39 and the manifold 54 to each other.

The exhaust valve 80 opens to discharge air in the valve-opening valve pressure chamber 39 to the manifold 54 upon the pressure in the manifold 54 dropping below the pressure in the valve-opening pressure chamber 39.

A rapid actuation button 85 for rapidly supplying air in the manifold 54 to the valve-opening pressure chamber 39 is installed in the exhaust valve 80. The rapid actuation button 85 makes it possible for the exhaust valve body 84 to decline by a pressing operation from the outside of the lower bonnet 33. In a state where the rapid actuation button 85 is not pressed, the O-ring 86 of the exhaust valve body 84 closes the communication passage 81 by the working pressure and the force of the compression spring 83; however, pressing the rapid actuation button 85 to decline the exhaust valve body 84 causes a gap between the O-ring 86 and the communication passage 81 to occur, thus causing the compressed air in the manifold 54 to be rapidly supplied into the valve-opening pressure chamber 39. In addition, an L-shaped annular projection 33D with its center on the axis of the lower bonnet 33 is formed on a lower surface of the lower bonnet 33. The L-shaped annular projection 33D is partly removed at the communication passages 61, 71 and 81; after the pressure regulation valve 60 and the exhaust valve 80 are fitted into the communication passages 61 and 81, respectively, a retainer ring 33L is installed onto the L-shaped annular projection 33D to prevent the pressure regulation valve 60 and the exhaust valve 80 from dropping off (see FIG. 3).

The slow-operating ON/OFF valve 10 that has the above-described structure operates in the following manner. Upon a supply port 55a of the switching valve 55 being connected to a flow passage, high-pressure compressed air from the pilot pressure source 56 is supplied instantaneously to the manifold 54 from the pressure inlet port 57. In a state where the pressure in the valve-opening pressure chamber 39 is lower than the reserve pressure, the steel ball 64 of the pressure regulation valve 60 moves away from the O-ring 63 while deforming the compression coil spring 65 by the pressure in the manifold 54 to introduce the compressed air in the manifold 54 into the valve-opening pressure chamber 39. Subsequently, upon the pressure in the valve-opening pressure chamber 39 reaching the reserve pressure, the steel ball 64 sits on the O-ring 63 by the force of the compression coil spring 65 to stop the supply of the compressed air to the valve-opening pressure chamber 39 from the manifold 54.

In the present embodiment, this reserve pressure is preset at a pressure immediately before the commencement of the movement of the piston body 34 in the valve-opening direction against the force of the valve-opening biasing spring 35. It is possible to set the valve-closing pressure of the pressure regulation valve 60 to such a balanced pressure with precision by the setting of the spring force of the compression coil spring 65 or the like. What is critical is the capability to change the pressure in the valve-opening pressure chamber 39 to the aforementioned balanced pressure within an extremely short period of time t (FIG. 7; dead time) from the moment the supply port 55a of the switching valve 55 is connected to a flow passage due to the presence of the pressure regulation valve 60. More specifically, the dead time t can be set to less than five seconds. It is a matter of course that the dead time can be shortened, theoretically to zero, as the difference between the reserve pressure and the valve-opening (piston-rising) commencement pressure is reduced; however, in reality, with consideration given to the reaction force of the valve-closing biasing spring 35, the dimensional accuracy of each component, secular change of the valve seal 25, etc., it is practical to set the reserve pressure to be slightly lower than the piston-rising commencement pressure and to set a small amount of time as the dead time.

Figure 7:
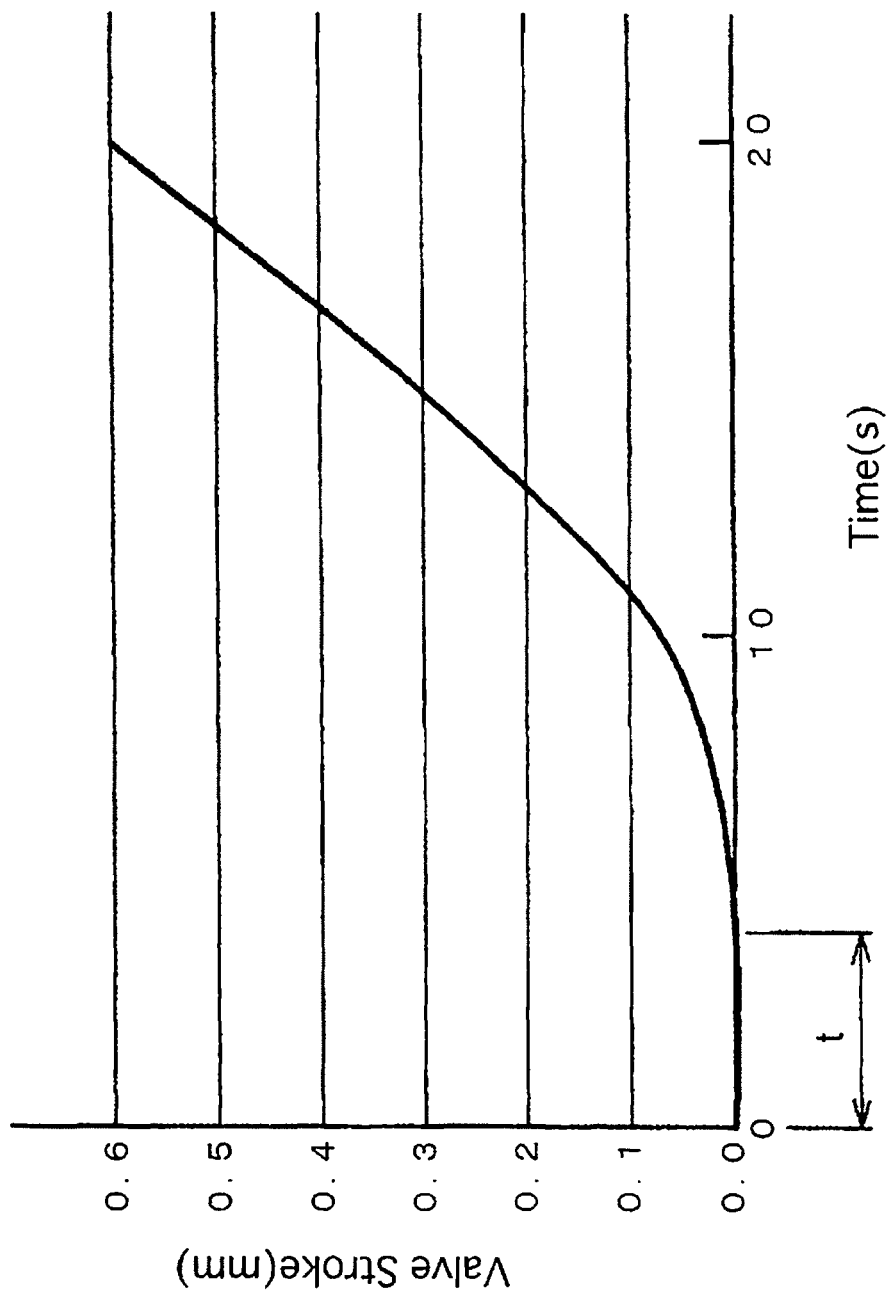
FIG. 7 is a graph showing an example of operating characteristics of the slow-operating ON/OFF valve according to the present invention.

Even after the pressure regulation valve 60 is closed, compressed air from the pilot pressure source 56 is still supplied into the manifold 54 via the supply port 55*a* of the switching valve 55. Therefore, this time compressed air is supplied into the valve-opening pressure chamber 39 from the needle valve 70 by extremely small amounts, so that the piston body 34 moves in the valve-opening direction in accordance with the speed of supply (supply quantity per unit of time) of this compressed air. Namely, the valve opening speed from the moment the piston body 34 starts moving can be made slow (FIG. 7). The valve opening speed after the commencement of opening of the valve (the inclination of the graph in FIG. 7) can be adjusted by the opening amount of the needle valve 70.

Detailed operations for opening the valve will be discussed below. Upon the force caused by the compressed air pressure in the valve-opening pressure chamber 39 exceeding the force of the compression spring 35, the piston body 34 and the transmission stem 36 move upward, so that the valve-closing force dissipates, and thereupon, the ON/OFF valve body 24 moves in the valve-opening direction by the pressure of the high-pressure gas in the gas cylinder and the force of the valve-opening biasing spring 24S, and the ON/OFF valve body 24 (the valve seal 25) moves away from the annular valve seat 23. As a result, the valve opens, thereby making it possible to draw the compressed gas in the gas cylinder from the flow passage 21*a* into the flow passage 22*a* (into an apparatus using a high-pressure gas which is screw-engaged onto the threaded-tap projection 22). More specifically, when the booster mechanism in the illustrated embodiment is used, the time until the ON/OFF valve body 24 (the valve seal 25) moves away from the annular valve seat 23 by 0.1 mm or 0.6 mm can be set to the order of 10 seconds or 20 to 30 seconds, respectively.

In addition, when it is desired to open the valve rapidly, the rapid actuation button 85 of the exhaust valve 80 is pressed. Upon the rapid actuation button 85 being pressed, the exhaust valve body 84 declines, which causes the O-ring 86 thereof to open the communication passage 81, thus causing the compressed air in the manifold 54 to be rapidly supplied into the valve-opening pressure chamber 39. Accordingly, it is possible to open the valve rapidly by rapidly moving the piston body 34 in the valve-opening direction against the biasing force of the valve-closing biasing spring 35.

On the other hand, upon a stop port 55*b* of the switching valve 55 being connected to a flow passage to exhaust the working pressure, the pressure in the manifold 54 drops below the pressure in the valve-opening pressure chamber 39 (to become equal to barometric pressure), which causes the air in the valve-opening pressure chamber 39 to be discharged into the manifold 54 via the exhaust valve 80 (the exhaust valve body 84); consequently, the force of the valve-closing biasing spring 35 causes the piston body 34 to return to the valve-closing position promptly to close the flow passage.

The specific configurations of the pressure regulation valve 60, the needle valve (flow rate regulation valve) 70 and the exhaust valve 80 in the above embodiment are merely examples. The pressure regulation valve 60 does not need to have a specific configuration as long as the pressure regulation valve 60 is of a type which allows air to flow into the valve-opening pressure chamber 39 from the manifold 54 until the pressure in the valve-opening pressure chamber 39 reaches a predetermined reserve pressure and which closes upon the pressure in the valve-opening pressure chamber 39 reaching the reserve pressure. Likewise, the needle valve (flow rate regulation valve) 70 only needs to be a valve capable of supplying air to the valve-opening pressure chamber 39 from the manifold 54, in minute increments, after the pressure in the valve-opening pressure chamber 39 reaches the reserve pressure, and the exhaust valve 80 only needs to be a valve capable of exhausting air to the manifold 54 from the valve-opening pressure chamber 39.

In addition, the valve mechanism which opens by the pressure in the valve-opening pressure chamber 39 is also merely an example. Additionally, although the piston body 34 is shown as an actuating member which performs a valve-opening operation by the pressure of the air supplied to the valve-opening pressure chamber 39 in the above described embodiment, the actuating member can be configured from a diaphragm assembly. The present invention can be attained if the manifold 54, which is for supplying a pilot pressure to the valve-opening pressure chamber 39, is formed independently (separately) from the valve-opening pressure chamber 39 and if the manifold 54 and the valve-opening pressure chamber 39 are communicatively connected to each other via the three valves: the pressure regulation valve 60, the needle valve 70 and the exhaust valve 80. Although the installation of the rapid actuation button 85 to the exhaust valve 80 makes a rapid air supply from the manifold 54 to the valve-opening pressure chamber 39 possible in the above described embodiment, the installation of the rapid actuation button 85 to the exhaust valve 80 is not indispensable. Namely, even though the rapid actuating valve is capable of being provided separately from the exhaust valve 80, the rapid actuating valve can be simplified in structure by using the exhaust valve 80.

INDUSTRIAL APPLICABILITY

The slow-acting ON/OFF valve can be used for, e.g., a pneumatic-operated ON/OFF valve used for a high-pressure gas cylinder.

DESCRIPTION OF THE REFERENCE NUMERALS

10 ON/OFF valve
20 Gas cylinder head
21 Screw-in connecting projection
22 Threaded-tap projection
21*a* 22*a* Flow passage
23 Annular valve seat
24 ON/OFF valve body
24S Valve-opening biasing spring
25 Valve seal
27 Metal diaphragm
28 Retainer
29 Intermediate valve body
29A External-force input end
30 Bonnet (Housing)
32 Upper bonnet
33 Lower bonnet
33A Motion transmission surface
33B Hard ring body
33C Central cylindrical portion
33D L-shaped annular projection
33L Retainer ring
34 Piston body (actuating member)
34A O-ring
35 Valve-closing biasing spring
36 Transmission stem
36A Diameter reducing portion
37 O-ring
39 Valve-opening pressure chamber 42 Push rod
42A Output end
42B Motion transmission surface
42C Radial groove
43 Steel ball (radially-movable body)
50 Lock ring
51 Underside cover
52 53 O-ring
54 Manifold
55 Switching valve
55a Supply port
55b Stop port
56 Pilot pressure source
57 Pressure inlet port
60 Pressure regulation valve
61 Communication passage
62 Retainer
63 O-ring (valve seat)
64 Steel ball (valve body)
65 Compression coil spring
70 Needle valve (flow rate regulation valve)
71 Communication passage
72 Screw thread
73 Needle valve body
73N Needle portion
80 Exhaust valve
81 Communication passage
82 Retainer
83 Compression spring
84 Exhaust valve body
85 Rapid actuation button
86 O-ring

The invention claimed is:

1. A slow-acting ON/OFF valve comprising:
an actuating member which actuates a valve body that comes into contact with and moves away from a valve seat to close and open a flow passage;
a spring device which biases said actuating member in a valve-closing direction;
a valve-opening pressure chamber which exerts a force in a valve-opening direction on said actuating member against said spring device;
a manifold provided independently of said valve-opening pressure chamber;
a pressure regulation valve which allows air to flow into said valve-opening pressure chamber from said manifold until pressure in said valve-opening pressure chamber reaches a predetermined reserve pressure, and which is closed upon said pressure in said valve-opening pressure chamber reaching said reserve pressure;
a flow rate regulation valve which supplies air to said valve-opening pressure chamber from said manifold, in minute increments, after said pressure in said valve-opening pressure chamber reaches said reserve pressure, the moving speed of the valve body toward the valve opening direction being adjusted by an opening amount of the flow rate regulation valve; and
an exhaust valve which discharges air in said valve-opening pressure chamber to said manifold upon pressure in said manifold dropping below said pressure in said valve-opening pressure chamber.

2. The slow-acting ON/OFF valve according to claim 1, wherein said exhaust valve comprises a rapid actuation button for communicatively connecting said manifold to said valve-opening pressure chamber.

* * * * *